UNITED STATES PATENT OFFICE.

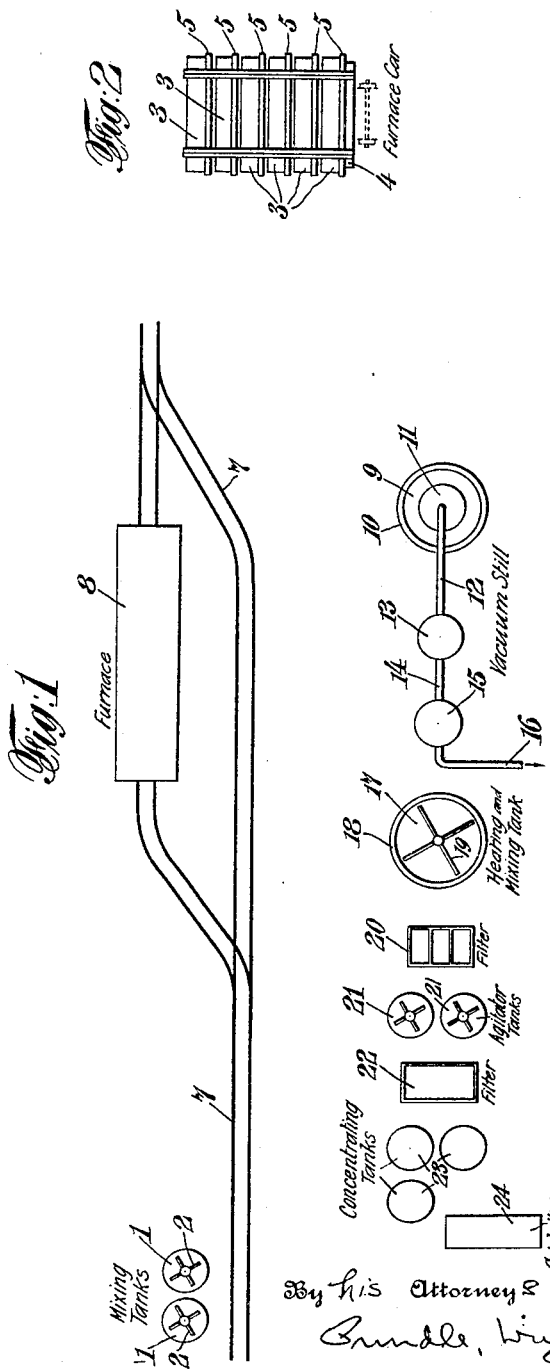

CARL HANER, JR., OF BALTIMORE, MARYLAND, ASSIGNOR TO U. S. INDUSTRIAL ALCOHOL CO., A CORPORATION OF WEST VIRGINIA.

PROCESS OF TREATING DISTILLERY WASTE.

1,396,368.   Specification of Letters Patent.   Patented Nov. 8, 1921.

Application filed October 22, 1917. Serial No. 197,887.

*To all whom it may concern:*

Be it known that I, CARL HANER, Jr., of Baltimore, in the State of Maryland, have invented a certain new and useful Improvement in Processes of Treating Distillery Waste, and do hereby declare that the following is a full, clear, and exact description thereof.

My invention relates particularly to a process for treating the waste obtained from distilleries in the production of alcohol that is to say, distillery slop.

The object of my invention is particularly to utilize the waste obtained from the distillation of various materials used in the production of ethyl alcohol.

More particularly, the object of my invention is to make use of the waste materials obtained in the production of ethyl alcohol from molasses, which may, for example, be obtained in the manufacture of cane or beet sugar, or from potatoes, grain, such as wheat, rye, barley, corn, etc.

Objects of my invention are, furthermore, to recover oxalic acid, as well as volatile organic acids and the caustic alkali which is used in the process.

Further objects of my invention will appear from the detailed description thereof contained hereinafter.

While my invention is capable of being carried out in many different ways, for the purpose of illustration, I shall describe only one way of carrying out the same herein; and, while my invention is capable of being carried out in connection with many different types of apparatus, I shall describe only one type of apparatus which may be used in connection therewith in the accompanying drawings, in which—

Figure 1 is a diagrammatic representation of an apparatus which may be used in connection with my invention; and Fig. 2 is an end elevation of a type of car used in connection with the same.

In the drawings, I have shown two preliminary mixing tanks 1, having a plurality of stirrer arms 2, adapted to be rotated in any suitable manner, said tanks 1 being provided for mixing caustic alkali with a quantity of the magma, which is in the embodiment herein described evaporated distillery waste or slop, having a density of approximately 25° Bé. or higher.

From the mixing tanks 1, the material may be conveyed into a plurality of pans 3 which may be carried on trucks 4, containing racks, or the like, 5 to receive the same, which trucks may be arranged to run upon a track 7 into a furnace chamber 8.

The dried material obtained from the furnace chamber 8, which is called "clinker," and which contains sodium oxalate, as well as the sodium salts of volatile organic acids, such, for example, as formic, acetic, butyric acids, etc., is preferably introduced into a still 9, which may have a heating jacket 10, which is preferably provided with a reflux condenser 11 thereon. To the clinker there may be added a quantity of water or a dilute solution of volatile organic acids obtained from a previous operation of this process, as well as oxalic acid in sufficient quantity to neutralize the excess of alkali present and liberate the volatile organic acids from their salts. The heating under the reflux condenser is preferably continued until approximately all of the sodium salts of the volatile organic acids are decomposed. Afterward the mixture may be distilled by closing the reflux condenser and causing the vapors to be drawn off from the still 9 by a pipe 12 to, *e. g.*, a condenser 13, which is shown as connected by a pipe 14 to a receiver 15, which is preferably attached by a pipe 16 to a vacuum pump, or the like, adapted to supply a vacuum of 28 to 29 inches.

In this way, a distillate is obtained containing the volatile organic acids. The dry residue which is left in the still 9, and which consists largely of sodium oxalate, as well as some coloring matter, may be treated with water and a precipitant such as lime in a tank 17, where it may be heated by means of a jacket 18 and agitated by a suitable agitating device 19. This forms, *e. g.*, calcium oxalate and sodium hydroxid. The mixture may be then passed through a filter 20, to remove the precipitate such as calcium oxalate, thus leaving a solution of sodium hydroxid, which may be concentrated and used over again in this process.

The calcium oxalate, or the like, thus obtained may be transferred to a plurality of agitator tanks 21, in which there may be introduced a quantity of an acid such as sulfuric acid sufficient to liberate the oxalic acid, and which may be heated by the heat of reaction or in any other suitable manner. The calcium or other sulfate thus formed may be filtered off through, e. g., a filter box 22, and the oxalic acid in solution may be collected in a plurality of concentrating tanks 23 and heated in any desired manner. The solution may be concentrated therein by evaporation, and the solution may be then removed from these tanks 23 into, e. g., a crystallizing pan 24, where the oxalic acid may be allowed to crystallize out. The oxalic acid thus obtained may be refined in any desired manner.

As a specific example of my invention, I may proceed as follows: A quantity of the distillery waste or slop, after having had the alcohol removed therefrom, is evaporated in the usual way to form a magma, which may have a density of 25° Bé. or higher. This magma may be mixed in the proportion of three parts by weight of magma to one part by weight of caustic soda in the tanks 2, until the alkali has become completely dissolved. If desired, the two tanks 2 may be operated alternately, so that, while one tank is being charged, the other is being discharged. The mixture thus obtained is transferred to the pans 3 on the trucks 4 and is introduced into the furnace chamber 8, where the material is subjected to a temperature of from 175° to 250° C. for 8 to 24 hours, the time of treatment being varied according to the temperature. Where the temperature is low, the treatment is for a longer period of time than where the temperature is higher. When the reaction is complete, the treatment in the furnace chamber 8 is discontinued. The effect of the treatment in the furnace chamber 8 is principally to bring about the production of oxalic acid and volatile organic acids. The clinker thus obtained, which often contains a quantity of sodium oxalate amounting to approximately 10% of the weight of the clinker and a quantity of sodium salts of a number of volatile acids, such as formic, acetic, butyric acids, etc., amounting to from 12% to 20% of the weight of the clinker, is introduced into the still 9, together with a quantity of water or a quantity of the volatile organic acids obtained from previous operations of this process, in the proportion of two parts by weight of clinker and one part by weight of water. An amount of oxalic acid is added sufficient in quantity to neutralize the excess of alkali and to liberate the volatile organic acids from their salts. This is usually an amount of oxalic acid equal to about 60% of the weight of the clinker. The heating in the still 9 is then continued for several hours under a reflux condenser until all of the sodium salts of the volatile acids have been decomposed. Afterward the reflux condenser is closed and a vacuum of 28 to 29 inches is applied, and the still heated to a temperature of 90° C., so as to distil off the volatile organic acids which are collected in the condenser 15.

The dry residue left in the still 9, which residue consists largely of sodium oxalate, as well as some organic coloring matter, is treated with water in the proportion of two or three parts by weight of water to one part by weight of the solids and an amount of lime which may be slightly in excess of that required to react upon all of the sodium oxalate, and which would ordinarily be one part by weight of lime to two parts by weight of solids, in the container 17, in which the contents are heated and agitated, so as to bring about the conversion of practically all the sodium oxalate into calcium oxalate.

The mass is then passed through filter 20, so as to remove the calcium oxalate from the solution and obtain a filtrate of sodium hydroxid, which may be concentrated and used over again in the process.

The calcium oxalate is thereupon removed to the agitator tanks 21 and mixed therein with a sufficient quantity of sulfuric acid to liberate the oxalic acid. An amount of sulfuric acid of 66° Bé., equal to one-half the weight of the wet filter cake, is added. The contents of the tanks 25 are then heated by the heat of reaction, or in any other suitable way, and agitated. Thereafter the contents of these tanks are passed through the filter 22 to separate out the calcium sulfate, and the filtrate is passed into the concentrating tanks 23, where the solution of oxalic acid is evaporated until oxalic acid crystallizes out on cooling. The mass is thereupon transferred to the crystallizing pan 24 and allowed to cool, so as to separate out the oxalic acid crystals.

The oxalic acid crystals may be refined in any desired manner.

While I have described my invention above in detail, I wish it to be understood that many changes may be made therein without departing from the spirit of my invention. For example, instead of calcium compounds, I may use salts of the other alkaline earth metals, and I wish this to be understood wherever I have referred to the use of calcium compounds also, instead of caustic soda I may use other alkalies, or carbonates of the alkali metals, or mixtures of the same.

I claim:

1. The process which comprises treating distillery waste with an alkali at a temperature of 175 to 250° C. to produce salts of oxalic acid and volatile organic acids and then liberating the volatile organic acids by the addition of oxalic acid.

2. The process which comprises treating distillery waste with an alkali at a temperature of 175 to 250° C. to produce salts of oxalic acid and volatile organic acids, then liberating the volatile organic acids by the addition of oxalic acid, and then distilling off the volatile organic acids.

3. The process which comprises treating distillery waste with an alkali at a temperature of 175 to 250° C. to produce salts of oxalic acid and volatile organic acids, then liberating the volatile organic acids by the addition of oxalic acid, and then adding lime to form calcium oxalate.

4. The process which comprises treating distillery waste with an alkali at a temperature of 175 to 250° C. to produce salts of oxalic acid and volatile organic acids, then liberating the volatile organic acids by the addition of oxalic acid, then adding lime to form calcium oxalate, and filtering to recover the sodium hydroxid as a filtrate.

5. The process which comprises treating distillery waste with an alkali at a temperature of 175 to 250° C. to produce salts of oxalic acid and volatile organic acids, then liberating the volatile organic acids by the addition of oxalic acid, then adding lime to form calcium oxalate, filtering to recover the sodium hydroxid as a filtrate, and then adding sulfuric acid to the filter cake to liberate the oxalic acid.

6. The process which comprises treating distillery waste with an alkali at a temperature of 175 to 250° C. to produce salts of oxalic acid and volatile organic acids, then liberating the volatile organic acids by the addition of oxalic acid, then adding lime to form calcium oxalate, filtering to recover the sodium hydroxid as a filtrate, then adding sulfuric acid to the filter cake to liberate the oxalic acid, and thereafter filtering off the calcium sulfate.

7. The process which comprises treating distillery waste with an alkali at a temperature of 175 to 250° C. to produce salts of oxalic acid and volatile organic acids, then liberating the volatile organic acids by the addition of oxalic acid, then adding lime to form calcium oxalate, filtering to recover the sodium hydroxid as a filtrate, then adding sulfuric acid to the filter cake to liberate the oxalic acid, thereafter filtering off the calcium sulfate, and then concentrating and crystallizing out the oxalic acid.

8. The process which comprises treating concentrated distillery waste with caustic soda at a temperature of from 175° to 250° C. to produce salts of oxalic acid and volatile organic acids, then liberating the volatile organic acids by the addition of oxalic acid, then adding lime to form calcium oxalate, filtering to recover the sodium hydroxid as a filtrate, then adding sulfuric acid to the filter cake to liberate the oxalic acid, thereafter filtering off the calcium sulfate, and then concentrating and crystallizing out the oxalic acid.

9. The process of treating distillery waste comprising heating it at a temperature of 175 to 250° C. with caustic alkali, adding water and oxalic acid sufficient to neutralize the alkali, heating to liberate volatile organic acids and distilling off the volatile organic acids, dissolving the residue in water and precipitating with lime, filtering off the oxalates from the caustic alkali and converting the calcium oxalate to oxalic acid.

10. The process of treating distillery waste comprising heating it at a temperature of 175 to 250° C. with caustic alkali, adding oxalic acid sufficient to neutralize the alkali, liberating the volatile organic acids and distilling off volatile organic acids.

In testimony that I claim the foregoing I have hereunto set my hand.

CARL HANER, Jr.

Witnesses:
ARTHUR A. BACKHAUS,
DEZTO E. D. HELEN.